(12) United States Patent
Rizzi et al.

(10) Patent No.: US 9,120,068 B2
(45) Date of Patent: Sep. 1, 2015

(54) ISOTHERMAL CHEMICAL REACTOR WITH PLATE HEAT EXCHANGER

(75) Inventors: Enrico Rizzi, Casnate Con Bernate (IT); Ermanno Filippi, Castagnola (CH); Mirco Tarozzo, Ligornetto (CH)

(73) Assignee: Casale SA (CH)

( * ) Notice: Subject to any disclaimer, the term of this patent is extended or adjusted under 35 U.S.C. 154(b) by 0 days.

(21) Appl. No.: 12/918,024

(22) PCT Filed: Feb. 13, 2009

(86) PCT No.: PCT/EP2009/001046
§ 371 (c)(1),
(2), (4) Date: Nov. 12, 2010

(87) PCT Pub. No.: WO2009/103461
PCT Pub. Date: Aug. 27, 2009

(65) Prior Publication Data
US 2011/0052457 A1   Mar. 3, 2011

(30) Foreign Application Priority Data
Feb. 18, 2008   (EP) .................................... 08002925

(51) Int. Cl.
*B01J 19/00* (2006.01)
*B01J 19/24* (2006.01)
(Continued)

(52) U.S. Cl.
CPC .............. *B01J 8/0285* (2013.01); *B01J 8/0214* (2013.01); *F28D 9/0006* (2013.01); *F28D 9/0062* (2013.01); *F28F 9/0263* (2013.01); *B01J 2208/0015* (2013.01)

(58) Field of Classification Search
CPC ................ B01J 8/00; B01J 8/02; B01J 19/00;
B01J 19/24; B01J 2219/00; B01J 2219/00049;
B01J 2219/00051; B01J 2219/00074; B01J 2219/00076; B01J 2219/00081; B01J 2219/00085; F28D 1/00; F28D 1/02; F28D 1/03; F28D 1/0308; F28D 1/0325; F28D 1/0333; F28D 9/00; F28D 9/0006; F28D 9/0062; F28F 3/00; F28F 3/12; F28F 3/14; F28F 9/00; F28F 9/001; F28F 9/007; F28F 9/0076; F28F 9/013; F28F 9/026; F28F 9/0263
USPC .......... 422/129, 198–201; 165/168–171, 173, 165/177, 179, 180
See application file for complete search history.

(56) References Cited

U.S. PATENT DOCUMENTS

| | | | | |
|---|---|---|---|---|
| 2,642,897 A | * | 6/1953 | Bell | 138/38 |
| 3,364,951 A | * | 1/1968 | Burne et al. | 138/38 |

(Continued)

FOREIGN PATENT DOCUMENTS

| | | | |
|---|---|---|---|
| EP | 1787715 A1 | * | 5/2007 |
| EP | 1284813 B1 | | 8/2007 |

(Continued)

OTHER PUBLICATIONS

Machine translation of FR2874129 A1, which was provided in IDS dated Aug. 17, 2010 and was published Feb. 10, 2006.*

*Primary Examiner* — Natasha Young
(74) *Attorney, Agent, or Firm* — Akerman LLP

(57) ABSTRACT

A chemical isothermal reactor (1) with internal plate heat exchanger (10) having heat-exchange radial plates (11), and radial ducts (14, 15) parallel to sides (13i, 13s) of the plates (11) for distributing and collecting a heat exchange fluid, said radial ducts having a portion with a smaller cross section near the inner converging ends (14c, 15c).

12 Claims, 5 Drawing Sheets

| (51) | Int. Cl. | |
|---|---|---|
| | B01J 8/00 | (2006.01) |
| | B01J 8/02 | (2006.01) |
| | F28D 1/00 | (2006.01) |
| | F28D 9/00 | (2006.01) |
| | F28F 3/00 | (2006.01) |
| | F28F 3/12 | (2006.01) |
| | F28F 3/14 | (2006.01) |
| | F28F 9/00 | (2006.01) |
| | F28F 9/007 | (2006.01) |
| | F28F 9/013 | (2006.01) |
| | F28F 9/02 | (2006.01) |

(56) References Cited

U.S. PATENT DOCUMENTS

| 3,946,804 A * | 3/1976 | Tkach et al. ............. 165/167 |
|---|---|---|
| 5,047,217 A | 9/1991 | Dang Vu et al. |
| 5,806,586 A | 9/1998 | Osthues et al. |
| 2005/0061490 A1 | 3/2005 | Filippi et al. |
| 2009/0145589 A1 | 6/2009 | Filippi et al. |

FOREIGN PATENT DOCUMENTS

| EP | 1854534 A1 * | 11/2007 |
|---|---|---|
| FR | 2874129 A1 | 2/2006 |
| WO | 02/072252 A1 | 9/2002 |

* cited by examiner

ISOTHERMAL CHEMICAL REACTOR WITH PLATE HEAT EXCHANGER

FIELD OF THE INVENTION

The invention relates to the field of isothermal chemical reactors equipped with an internal plate heat exchanger.

The invention is applicable, for example, to isothermal or pseudo-isothermal chemical reactors for exothermic or endothermic heterogeneous reactions, wherein the internal heat exchanger is immersed in a catalytic layer, or to reactors where the internal heat exchanger, in operation, is immersed in a fluid.

PRIOR ART

Isothermal or pseudo-isothermal chemical reactors are reactors equipped with an internal heat exchanger adapted to maintain the temperature of the reaction in a range of optimal efficiency, by providing or removing heat from the reagents. Isothermal reactors are widely used, for example, in methanol synthesis plants, where the reactor comprises an internal cooling heat exchanger to remove heat generated by the exothermic methanol synthesis reaction.

Isothermal reactors equipped with a plate heat exchanger are known to provide many advantages. The term "plate reactor", in the following description, is used with reference to a chemical isothermal (or pseudo-isothermal) reactor equipped with at least an internal plate heat exchanger. A plate reactor is disclosed for example in EP-A-1284813.

The heat exchange elements, called plates, are in the form of box-shaped flattened bodies, comprising two substantially rectangular walls, connected with each other at least along the perimeter, so as to define an internal chamber or passage where a heat exchange fluid (e.g. water or steam) is circulated. The plates are supported inside the reactor with known means, and are connected to appropriate means for feeding and collecting the heat exchange fluid. Differently structured plates are known in the art, including the so-called "swelled" plates, formed by two flat metal sheets joined by a perimeter welding and other welding points, and subjected to high pressure hydraulic swelling for obtaining the internal chamber between the two sheets.

Plate reactors are appreciated for their large available heat exchange surface, compared to the overall size, their low cost and easy mounting inside the reactor.

The internal plate heat exchanger is often formed as a substantially annular unit, with radial plates converging towards the axis of the reactor. In a known layout of a vertical reactor with internal, axial-flow or axial-radial flow heat exchanger, the plates of the heat exchanger are arranged with long sides parallel to the vertical axis of the reactor, and radial short sides converging towards the same axis; cylindrical pipes are fixed to the bottom and top short side of each plate, to feed and collect the heat exchange fluid.

More in general, the means for feeding and collecting the heat exchange fluid of annular heat exchangers, as defined above, often comprise radial pipes or ducts aligned with short, radial sides of the plates. Hence, said cylindrical pipes for the heat exchange fluid have diverging ends, namely the external ends lying on an external diameter of the annular structure of the heat exchanger itself, and converging ends, namely the opposite ends lying on an internal diameter of the same, near the axis of the chemical reactor.

The spacing between the plates depends on various design parameters but, as a general rule, plates are relatively close together in order to increase the ratio between heat exchange surface and overall volume of the exchanger. Hence, the converging ends of said radial pipes can interfere each other or, in any case, the interspace between converging ends may become too little, causing some practical disadvantages, such as obstacle to discharge or refill the catalyst.

To solve this problem, the prior art discloses solutions as shown in FIGS. 5 and 6.

Referring to FIG. 6, plates 100 of an annular plate heat exchanger have fluid collectors 101, fixed to their short sides. Inner ends of collectors 101 converge in a zone 112, near the central axis of the reactor. As shown, to avoid interference between collectors 101 in said zone 112, plates 100 are disposed on two levels, so that the collectors 101 are alternatively lying on an upper and a lower plane. In exceptional cases, more than two levels can be used. This solution however has the drawbacks of a more complex and expensive construction.

Referring to FIG. 7, another prior-art solution is shown, where plates 100 have angular cuts (or chamfers) 113 to keep the converging ends of collectors 101 distanced from the axis of the reactor (i.e. lying on a greater diameter) and hence avoid interference. This solution however is not always fully satisfying: the plates are more difficult to realize and the fluid flow inside is disturbed by cuts 113; moreover a transversal flow must be allowed inside the plates, in order to equalize the outlet flow and compensate for presence of said cuts 113.

The solutions of FIGS. 6 and 7 are sometimes used in combination, leading however to even more complex and expensive heat exchangers.

The above problem is felt especially in reactors for strongly exothermal reactions, where the heat exchange fluid is a liquid evolving at least partially to a vapour and the collectors need a larger cross section. This is the case for example of reactors wherein the heat removed from the chemical reaction is used to produce steam, and interference between converging ends of the large steam collectors is difficult to avoid.

SUMMARY OF THE INVENTION

The problem underlying the present invention is to provide appropriate spacing, and avoid mechanical interference, between internal ends of radial heat exchange fluid feeding or collecting ducts of radial heat exchange plates installed inside isothermal chemical reactors.

The problem is solved with a chemical isothermal reactor comprising at least one plate heat exchanger with a substantially annular structure, said heat exchanger comprising a plurality of radially-arranged heat-exchange plates, and at least one set of radial ducts for feeding or collecting a heat exchange fluid to/from internal passage(s) of said plates, said radial ducts being aligned with radial sides of the plates, said radial ducts having diverging ends and opposite converging ends due to their radial arrangement, said reactor being characterized in that the converging ends of radial ducts of said at least one set of radial ducts have a reduced cross section compared to the respective diverging ends.

The invention also relates to a plate heat exchanger for use in isothermal chemical reactors, said heat exchanger comprising a plurality of radially-arranged heat-exchange plates, and at least one set of radial ducts for feeding or collecting a heat exchange fluid to/from internal passage(s) of said plates, said radial ducts being aligned with radial sides of the plates, said radial ducts having diverging ends and opposite converging ends due to their radial arrangement, said reactor being characterized in that the converging ends of said radial ducts have a reduced cross section compared to the respective diverging ends.

The opposite converging and diverging ends of the radial ducts lie respectively on a first and second diameter of said annular structure, i.e. they are distributed over an inner and an outer circumference, having said first and second diameter respectively.

Said radial ducts, according to the invention, are the feeding ducts and/or the collecting ducts of the heat exchange fluid. The radial ducts for the heat exchange fluid, according to an embodiment of the invention are fixed (e.g. welded) to short sides of the plates.

In one embodiment of the invention, the heat exchanger has opposite radial ducts for feeding and collecting the heat exchange fluid to/from the heat exchange plates, e.g. upper and lower ducts in a vertical arrangement, and all of said opposite radial ducts have the converging ends with a reduced cross section compared to the respective diverging ends. In another and simplified embodiment of the invention, the radial ducts are formed with reduced-cross section converging ends only at one side of the plates, preferably the fluid outlet side. This embodiment can be preferred when the outlet volumetric flow of the heat exchange fluid is significantly greater than the inlet volumetric flow, e.g. the fluid is at least partially evaporated through the plates. In this case, larger outlet ducts may be required to accommodate the increased volumetric flow, and the above problem of the physical interference of the converging ends is critical at the fluid-outlet side of the heat exchanger. A conventional duct with a constant cross section, in some cases, can still be used at the fluid inlet side.

In a preferred embodiment, each radial duct or pipe has at least a tapered portion, where the cross section is continuously decreasing towards the inner, converging end of the duct. More preferably said tapered portion is conical or frusto-conical.

According to embodiments of the invention, the heat-exchange fluid ducts comprise a cylindrical portion and a tapered, preferably conical portion with a cross section constantly decreasing towards said converging ends; according to another embodiment, the ducts are tapered or conical for their whole radial length, from the outer diverging end to the inner converging end.

The cone angle of conical ducts is preferably less than 10 degrees, more preferably between 10' (ten minutes of arc) and 5 degrees.

According to another embodiment, said radial ducts of the heat exchange plates comprise a plurality of portions with different respective cross section, the portion near the converging end of each duct having a cross section smaller than the other portion(s) of the same duct. Preferably, each of the radial ducts is realized with an outer cylindrical portion having a first diameter and a second inner portion, near the converging end, having a second diameter smaller than said first diameter.

According to an aspect of the invention, said ducts with reduced cross section at the converging ends are used in combination with heat exchange plates having a sandwiched structure, each plate comprising two walls and internal spacer elements, said spacer elements connecting said walls and defining internal channels for the heat exchange fluid, between the two walls.

The invention solves the problem of the interference of feeding/collecting ducts, as defined above.

The invention is particularly advantageous when the heat exchanger is equipped with the sandwiched plates as defined above. Said plates have a strong resistance to a high pressure difference between inside and outside (such as 100 bars and beyond), and have been found to reduce internal pressure drop, so their use can be preferable in comparison, for example, to inflated pillow plates. Due to their structure with the internal channels defined by the spacer elements, however, such plates does not allow to implement a solution as seen in FIG. 7, as it would not be possible to easily connect the internal channel(s), near the axis of the reactor, to the respective fluid duct. With the known art, a heat exchanger with sandwiched plates would require the expensive and complex arrangement of FIG. 6 to avoid interference of the internal ends of the fluid ducts, thus limiting the possible applications of these exchangers.

The invention however can be used with any kind of heat-exchange plates, including the aforementioned inflated plates, maintaining the advantage of a correct spacing between the internal, converging ends of the fluid ducts, together with low cost and ease of installation.

The features and advantages of the present invention will be more evident from the following description of preferred indicative and non-limiting embodiments, with reference to the attached figures.

DETAILED DESCRIPTION OF PREFERRED EMBODIMENTS

Figure 1:
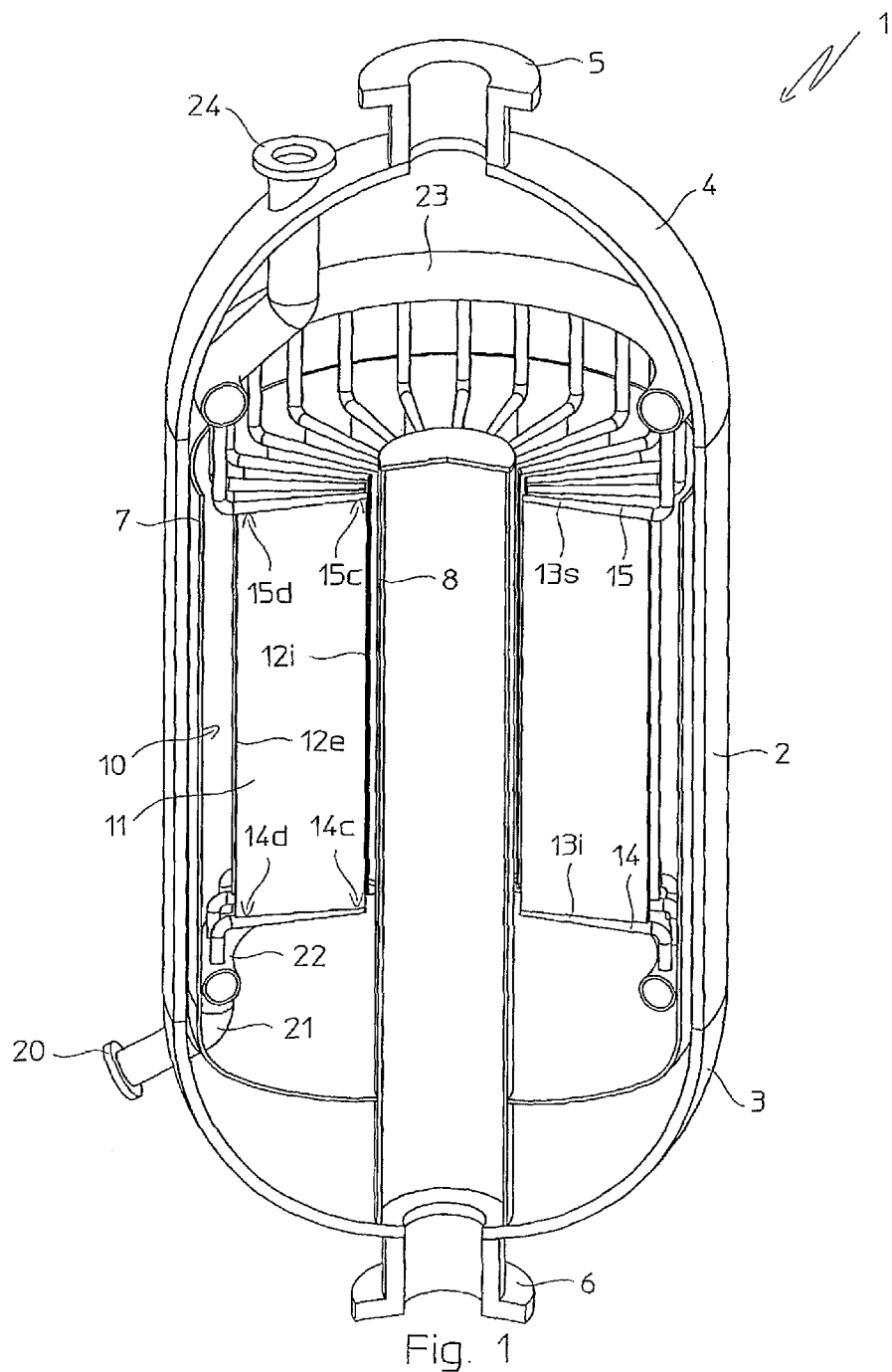
FIG. 1 schematically shows a partially cut-out view of an isothermal chemical reactor, according to a preferred embodiment of the invention.

With reference to FIG. 1, a radial-flow isothermal chemical reactor 1 is shown which essentially comprises a vertical-axis cylindrical shell 2, a lower end 3 and an upper end 4, respectively with an inlet flange 5 for the fresh charge of reagents, and an outlet flange 6 for the products of a chemical reaction.

The reactor 1 contains an annular catalytic rack, which is per se known and not described in detail, containing an appropriate catalyst and externally delimited by a cylindrical perforated wall 7. The reagents flow in a radial direction, from an interspace between the wall 7 and the shell 2, to a central collector 8 which is in communication with the outlet flange 6. The annular space defined by the catalytic rack is substantially the reaction space, where the reagents are converted into products.

An axial-flow plate heat exchanger 10 is mounted inside the reactor 1, immersed in the catalyst. The heat exchanger 10 has substantially an annular structure, with radial plates 11 in the form of substantially rectangular box-shaped flattened bodies, having long sides 12$i$, 12$e$ parallel to the axis of the reactor and radial short sides 13$s$, 13$i$.

Plates 11 are connected to suitable distribution means of a heat exchange fluid, for example cooling water. In the example, the heat exchange fluid enters from lower sides 13$i$, flows axially inside the plates 11 and exits from upper sides 13$s$. The fluid is distributed via radial ducts connected to the plates 11 in an appropriate way; in the example the fluid is distributed via a set of radial pipes 14 fixed to the lower sides 13$i$ of the heat-exchange plates 11, and collected by a set of radial pipes 15 fixed to the upper sides 13s. Each plate 11 is equipped with a respective distributor pipe 14 and a respective collector pipe 15.

The fluid is fed via a piping system comprising an inlet flange 20, a pipe 21, and another annular pipe 22, feeding the distributor pipes 14. Fluid passes from each of said distributor pipes 14 to the inside of the respective plate 11 for example by holes or slits of the pipe 14, which are known per se. The collector pipes 15 receive the fluid from plates 11, and are connected to an annular pipe 23 and to an exit flange 24.

The pipes 14 and 15, due to their radial arrangement inside the reactor 1, have diverging ends 14d and 15d arranged on a first circumference having a first diameter slightly less than diameter of wall 7, and opposite converging ends 14c and 15c arranged on a second circumference having a second diameter slightly greater than the diameter of the central duct 8. Said first diameter is substantially equal to the external diameter of the annular heat exchanger 10, while said second diameter is substantially the internal diameter of the same annular structure.

The distributor pipes 14 and/or the collector pipes 15 have a reduced cross-section at least near the converging ends 14c, 15c, in order to avoid interference and maintain a suitable spacing between the pipe ends. To this purpose, the pipes 14 and/or the pipes 15 are preferably conical pipes as shown.

Figure 2:
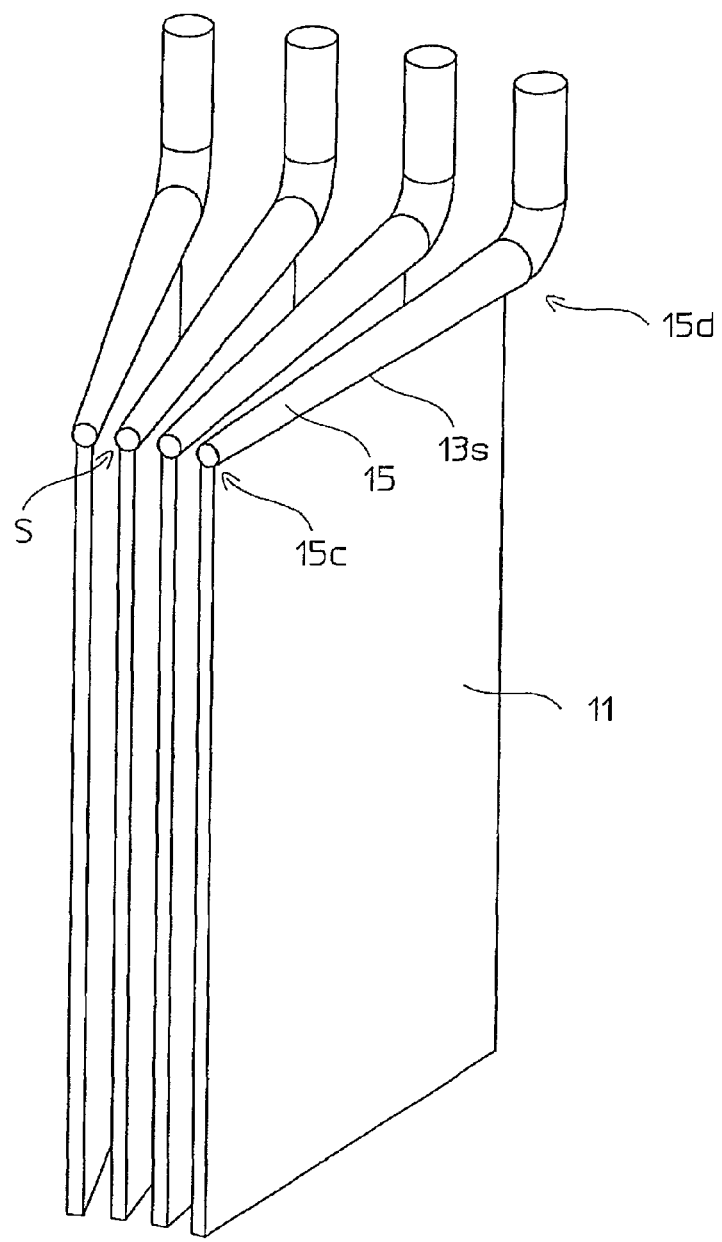
FIG. 2 schematically shows some details of FIG. 1.

Referring to the detailed view of FIG. 2, conical collector pipes 15 are fixed on upper short sides 13s of plates 11, thus having converging ends 15c, near the axis of the reactor, with a smaller cross-section than the opposite ends 15d, and leaving a suitable spacing S between the pipe ends.

Said conical pipes 15 (FIG. 2) have a cross section uniformly decreasing from ends 15d to ends 15c. Preferably, the annular pipes 22 and 23 are placed around the diverging ends 15d where more room is available.

Figure 3:
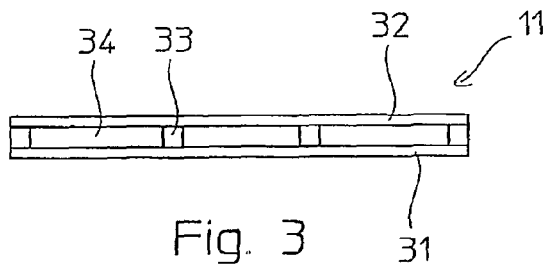
FIG. 3 is a cross section of one of plates of the exchanger inside the reactor of FIG. 1, according to a preferred embodiment.
Figure 4:
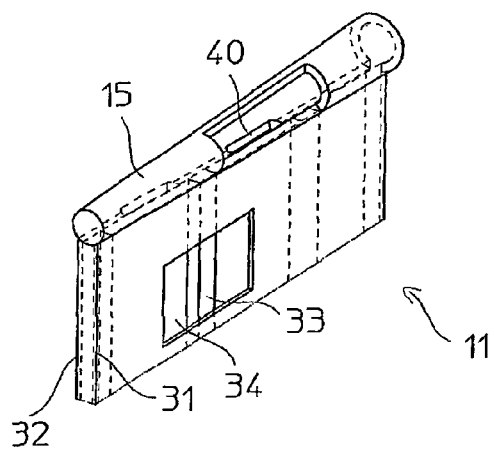
FIG. 4 shows details of the plate and fluid duct of FIGS. 1 and 2.

According to an embodiment (FIGS. 3-4), each plate 11 essentially comprises two walls 31 and 32, parallel to each other, connected by internal spacers 33 defining channels 34 for the heat exchange fluid. Additional spacers can be provided along the longitudinal perimeter edges of the walls 31 and 32, for the lateral sealing of the plate 30. The walls 31 and 32, in a preferred embodiment, are formed from respective flat metal sheets, and the spacers 33 are represented by plate strips, of appropriate thickness equal to height of channels 34. The conical pipes 15 comprise openings or slits 40, each slit 40 being in fluid communication with at least one of said channels 34. Preferably there is one slit 40 for each channel 34.

The distributors 14 can be realized in the same manner as collectors 15 above described. According to the invention, at least the heat exchange fluid distributors or the heat exchange fluid collectors have the reduced cross section at the converging ends.

Figure 5:
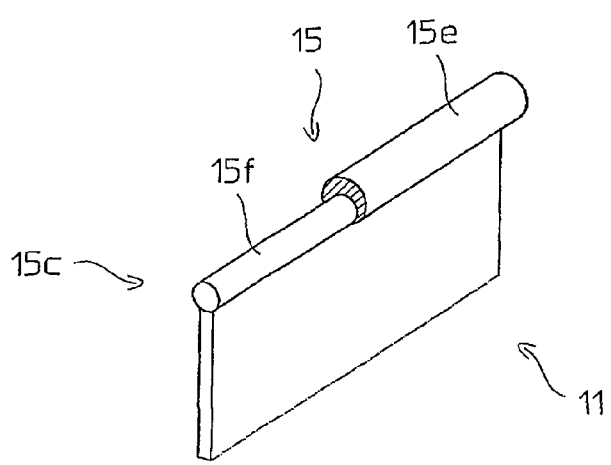
FIG. 5 refers to another embodiment of the invention.
Figure 6:
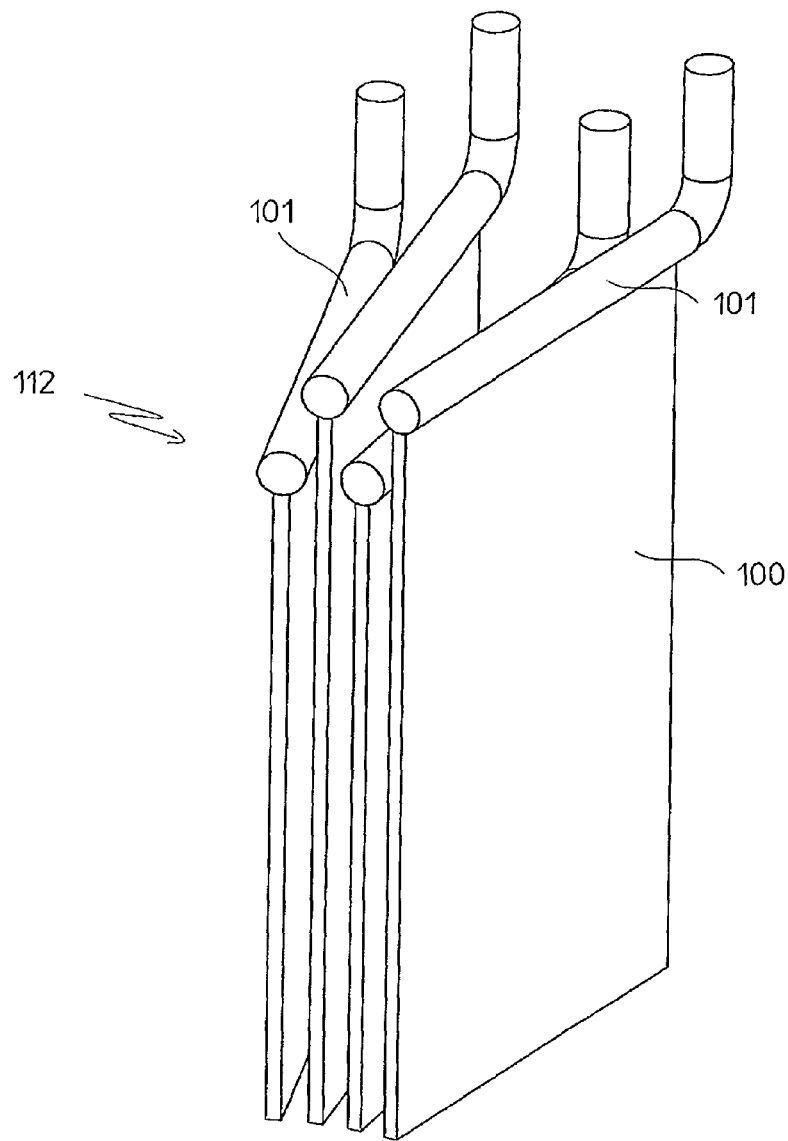
Figure 7:
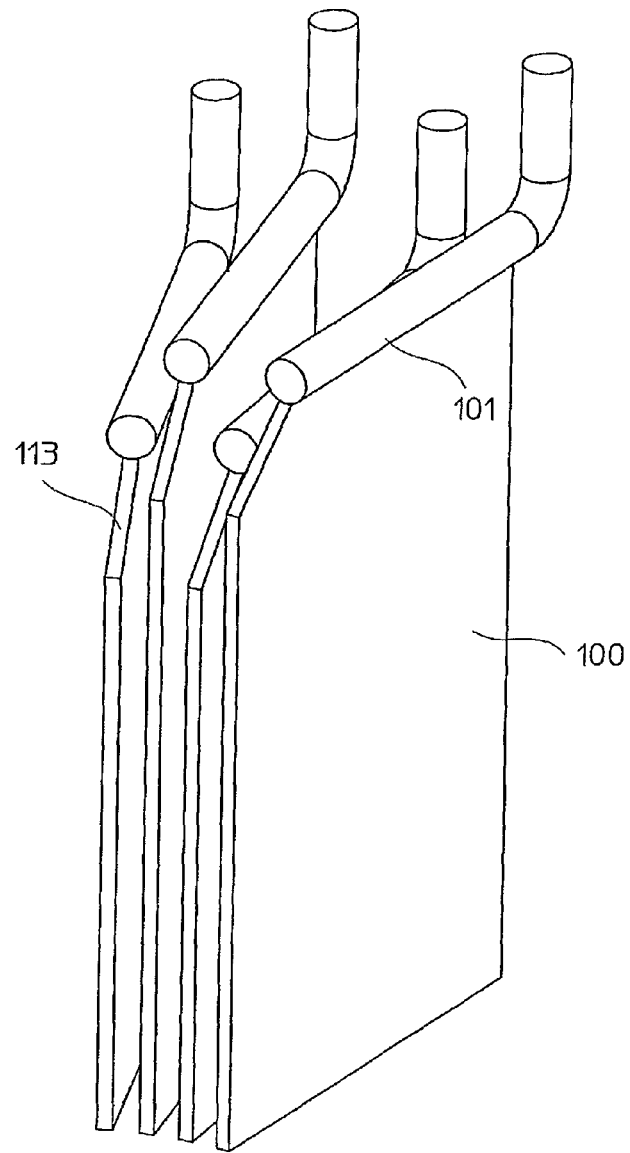

According to other embodiments, distributor pipes 14 and/or collector pipes 15 comprise portions with respective different cross sections. Referring to the example of FIG. 5, each of the pipes 15 comprises an outer cylindrical portion 15e having a first diameter, and an inner cylindrical portion 15f, near the converging end 15c of duct 15, said inner portion 15f having a second diameter smaller than diameter of the first portion 15e. According to another (not shown) embodiment, the radial pipes 14 and/or pipes 15 comprise more than two portions, with the cross section decreasing from outer end to inner end of the pipe itself.

The operation is as follows. Reagents are fed to reactor 1 by flange 5, and radially flow through the catalytic reaction zone, where the exchanger 10 is installed. A heat exchange fluid, for example water, is fed to the plates 11, entering and exiting through flanges 20, 24 and related piping.

The reduced-cross section converging ends 14c, 15c of pipes 14, 15, as seen in FIG. 1, avoid interference between the pipes and leave a suitable free space S (FIG. 2) between the pipes, useful for example to discharge/re-feed the catalyst.

Referring for example to an exothermal reaction, the exchanger 10 cools the catalytic bed and the reaction products, maintaining the reaction temperature in an optimal efficiency range. The heat exchange fluid, to this purpose, can be water which is at least partially evaporated inside plates 11. In this case, as steam requires larger pipes, the provision of water/steam collectors having a reduced-cross section at the converging ends is particularly advantageous.

As is evident to the man skilled in the art, the invention is applicable to any kind of chemical reactor containing a plate heat exchanger, in particular to radial-flow, axial-flow or transversal-flow reactors.

The invention claimed is:

1. A chemical isothermal reactor comprising:
    at least one plate heat exchanger with a substantially annular structure,
    said heat exchanger comprising a plurality of radially-arranged heat-exchange plates, one set of first radial ducts for feeding a heat exchange fluid to internal passage(s) of said plates and one set of second radial ducts for collecting said heat exchange fluid from internal passage(s) of said plates,
    said radial ducts being aligned with radial sides of the plates,
    said radial ducts having opposite ends, wherein the ends of said radial ducts facing a central axis of the reactor are closer to one another (converging ends) with respect to the opposite ends of the radial ducts, which are more spaced apart to one another (diverging ends), and,
    wherein the converging ends of radial ducts of said sets of first and second radial ducts for feeding and for collecting said heat exchange fluid have a reduced cross section compared to their respective diverging ends, or the converging ends of radial ducts of said second set of radial ducts for collecting said heat exchange fluid have a reduced cross section compared to their respective diverging ends while radial ducts of said set of first radial ducts for feeding said heat exchange fluid have a constant cross-section.

2. The reactor according to claim 1, wherein at least a portion of each of said radial ducts is a tapered portion, having a cross section continuously decreasing towards the converging end of the duct.

3. The reactor according to claim 2, wherein said tapered portion of the radial ducts is conical or frusto-conical.

4. The reactor according to claim 3, wherein said tapered portion has a cone angle less than 10 degrees.

5. The reactor according to claim 1, wherein said radial ducts is fixed to corresponding sides of the plates.

6. The reactor according to claim 1, wherein said radial ducts of the heat exchange plates comprise a plurality of portions with respective different cross section, each duct having a portion near the converging end with a cross section smaller than the other portion(s) of the same duct.

7. The reactor according to claim 6, wherein each of said radial ducts has an outer cylindrical portion with a first diameter and an inner cylindrical portion, near the converging end of the duct, the inner portion having a diameter smaller than the diameter of the first portion.

8. The reactor according to claim 1, wherein said plates have a structure comprising a first wall and a second wall, and internal spacer elements, connecting said first wall to said second wall, defining channels for a heat exchange fluid between said first and second walls.

9. The reactor according to claim 8, wherein said radial ducts have openings in fluid communication with said channels formed in the plates for the heat exchange fluid.

10. The reactor according to claim 1, wherein said heat exchanger comprises a set of fluid-feeding radial ducts and a set of fluid-collecting radial ducts for feeding and collecting a heat exchange fluid to/from said plates, said fluid-feeding and fluid-collecting radial ducts having converging ends with a reduced cross section compared to the respective diverging ends.

11. The reactor according to claim 10, wherein said heat exchanger comprises a fluid-feeding radial duct and an opposite fluid-collecting radial duct for each one of said radially-arranged plates, said opposite fluid-feeding and fluid-collecting radial ducts having converging ends with a reduced cross section compared to the respective diverging ends.

12. A plate heat exchanger with substantially annular structure for use in an isothermal chemical reactor, said heat exchanger comprising:
   a plurality of radially-arranged heat-exchange plates,
   one set of first radial ducts for feeding a heat exchange fluid to internal passage(s) of said plates and one set of second radial ducts for collecting said heat exchange fluid from internal passage(s) of said plates,
   said radial ducts being aligned with radial sides of the plates,
   said radial ducts having opposite ends, wherein the ends of said radial ducts facing a central axis of the reactor are closer to one another (converging ends) with respect to the opposite ends of the radial ducts, which are more spaced apart to one another (diverging ends), and,
   wherein the converging ends of radial ducts of said sets of first and second radial ducts for feeding and for collecting said heat exchange fluid have a reduced cross section compared to their respective diverging ends, or the converging ends of radial ducts of said set of second radial ducts for collecting said heat exchange fluid have a reduced cross section compared to their respective diverging ends while radial ducts of said set of first radial ducts for feeding said heat exchange fluid have a constant cross-section.

\* \* \* \* \*